United States Patent [19]

Farkonas et al.

[11] Patent Number: 5,173,074
[45] Date of Patent: Dec. 22, 1992

[54] METHOD AND APPARATUS FOR SEVERING SHIRRED TUBULAR FOOD CASING, AND ARTICLE

[75] Inventors: John Farkonas, Glenview; Michael P. Kazaitis, Chicago, both of Ill.

[73] Assignee: Viskase Corporation, Chicago, Ill.

[21] Appl. No.: 868,431

[22] Filed: Apr. 15, 1992

Related U.S. Application Data

[63] Continuation-in-part of Ser. No. 775,861, Oct. 15, 1991, Pat. No. 5,145,449.

[51] Int. Cl.$^5$ ............................................. A22C 13/02
[52] U.S. Cl. ........................................ 452/29; 452/21
[58] Field of Search .................... 452/29, 21, 22, 24

[56] References Cited

U.S. PATENT DOCUMENTS

| | | | |
|---|---|---|---|
| 3,112,517 | 12/1963 | Ives | 452/21 |
| 3,209,398 | 10/1965 | Ziolko | 452/24 |
| 3,594,855 | 7/1971 | Urbutis | 452/29 |
| 3,936,909 | 2/1976 | Carter | 452/29 |
| 3,942,221 | 3/1976 | Sipusic et al. | 452/29 |
| 4,052,770 | 10/1977 | Asquith | 452/29 |
| 4,153,975 | 3/1979 | Ziolko | 452/29 |
| 4,547,932 | 10/1985 | Romeike et al. | 452/26 |
| 4,622,718 | 11/1986 | Glanz | 452/29 |
| 4,773,127 | 9/1988 | Stall | 452/29 |
| 4,792,047 | 12/1988 | Wood et al. | 452/29 |
| 4,885,821 | 12/1989 | Farkonas | 452/29 |

*Primary Examiner*—Willis Little
*Attorney, Agent, or Firm*—Roger Aceto

[57] ABSTRACT

Severing a shirred stick of sausage casing from casing feed stock joined to the stick is accomplished by perforating a section of the casing across its flat width prior to moving the section through a shirring zone. The section is then moved to a shirring zone where longitudinal movement of the casing is restrained while shirring rolls continue to pull on the casing. The resulting tension tears the casing apart along the line of perforations and the shirring rolls incorporate a torn end of the casing into the shirred stick by gathering the torn end up into a pleat at the last-shirred end of the stick.

10 Claims, 3 Drawing Sheets

METHOD AND APPARATUS FOR SEVERING SHIRRED TUBULAR FOOD CASING, AND ARTICLE

This is a continuation-in-part of Ser. No. 775,861, now U.S. Pat. No. 5,145,449.

TECHNICAL FIELD

The present invention relates to the production of shirred casing sticks and more particularly to a method and apparatus for severing a shirred stick from the casing feed stock, and a shirred casing article.

BACKGROUND OF THE INVENTION

Food casings of regenerated cellulose are widely used for the production of various stuffed food products. The present invention is concerned primarily with thin walled unreinforced cellulosic casing as may be used in the production of small diameter sausages such as frankfurters and the like.

For convenience of handling, food casings which may be 20 to 50 meters or more in length are shirred and preferably compressed to produce what commonly are referred to as "shirred casing sticks". Shirring machines for producing these shirred sticks are well known in the art and are disclosed in U.S. Pat. Nos. 2,983,949 and 2,984,574 among others. Shirring and related technology also are described in the Noyes Data publication "Sausage Casing Technology" by Karmas (1974) at pages 259-347.

Cellulosic casing for the shirring operation is supplied in reels. Flat casing feed stock, drawn from the reel, is fed into the mandrel of a shirring machine where it is inflated with low pressure gas, usually air. Inflation is maintained by passing the feed stock through the nip of feed rolls located in advance of the shirring mandrel. The inflated casing is moved onto and along the mandrel and through a shirring zone where a shirring mechanism gathers the inflated casing about the mandrel into generally conical pleats nested one tightly against another. The inner folds of the pleats are formed against the mandrel and define the surface of an axial bore through the stick.

When a preselected shirred length has been attained, it is severed and moved longitudinally away from the shirring mechanism for further processing. Such further processing may include, for example, a compaction operation where the shirred length is reduced and an operation where a closure is formed and inserted to stop or plug the bore at one end of the casing thereby forming a "closed" end. The other end of the casing is left open to permit mounting of the shirred stick onto a stuffing horn.

In many cases, the severing operation produces a tail of loose casing 6 to 25 mm long extending from the tightly nested pleats at the stick open end. This tail not only detracts from the appearance of the stick, but also interferes with the functionality of the stick by interfering with the passage of a stuffing horn into the stick bore.

The compaction operation to some extent presses this loose casing against the tightly nested pleats of the stick open end but often the compressed tail of casing loosens and sags across the bore opening. Various operations have been devised to prevent this. For example, the tail may be peeled manually from the end of the stick so only tightly nested pleats remain. In U.S. Pat. No. 4,594,274 a heated die is used to press and iron the loose tail against the end of the stick. In U.S. Pat. No. 4,873,748 a rotating cup is used to burnish the tail against the tightly nested pleats of the stick open end.

Severing means such as disclosed in U.S. Pat. No. 4,885,821, have been developed to shorten or eliminate the formation of a loose tail of casing when severing a shirred length. However improvements are still desirable.

Severing a shirred length has been accomplished both manually and by automatic means located after, (i.e., downstream) the shirring zone. For example, one general method is to wait until some length of shirred casing has accumulated and then separate off a desired length from this accumulated shirred length as disclosed for example in U.S. Pat. No. 3,112,517. Another general method is to shirr only a desired length and then separate this shirred length from the feed stock. This general method is disclosed for example in U.S. Pat. Nos. 3,936,909; 4,547,932 and 4,885,821 among others.

Whatever the severing means, it is desired that the casing be cut cleanly to avoid so called "shards" or "flags" which are ragged pieces of casing attached to one or both the severed ends. When tensioning is relied upon to sever the casing, shards are often formed on one or both of the severed ends. U.S. Pat. No. 4,885,821 illustrates that in a casing under tension, a tear, which initiates at some point on the casing, propagates in opposite directions around the casing. If the ends of the tear propagation fail to meet in the same transverse plane, they overlap and run past one another. As the tear continues to propagate, one end of the tear eventually will run into the other which causes a loose piece or so called "shard" or "flag" of casing to form on one of the severed ends. If tears initiate at a plurality of points around the casing, then several shards may be formed.

Shards at the severed ends of the casing are objectionable because they may separate from the casing and become incorporated into the food product being stuffed into the casing. This is especially the case when using the casing for stuffing frankfurters. After a shirred stick is stuffed with a frankfurter emulsion, it is common for the operator to squeeze out or "milk" emulsion from the ends of the casing so the ends can be tied off. When this is done, shards at the end of the casing can rip free. Since the emulsion squeezed out of the casing is recovered and recycled, any shard of casing ripped off by the procedure may become incorporated into the emulsion supply.

Accordingly, it is most desirable to sever the shirred stick from casing feed stock in a manner which at least reduces the size of shards on the severed ends of casing, and preferably eliminates their formation.

Various severing methods have been proposed to reduce the instances of forming shards on the ends of the severed casing. For example, U.S. Pat. No. 4,885,821 discloses a severing apparatus wherein closing three arcuate members about the shirring mandrel provides a knife edge in the form of a closed circle at a location after, i.e., downstream of the shirring zone. This edge is pressed against the end face of the shirred stick to push the stick longitudinally along the mandrel and this causes the feed stock to tear away along the knife edge.

In U.S. Pat. No. 3,936,909 three arcuate members, also located downstream of the shirring zone, are closed about the circumference of an inflated section of the feed stock casing close to the end face of the shirred stick. The arcuate members form a closed circle about the casing and weakens the casing either by heating or by perforating it about substantially the full circumference of the casing. Subsequent longitudinal displacement of the shirred casing along the mandrel will cause the feed stock to separate from the stick at the weakened section.

The operation of closing arcuate members about the casing presents certain problems. For example, if the casing and arcuate members are not on the same center, the casing may not be uniformly severed so that shards on one or both severed ends results. Also, the casing which passes through the shirring zone is creased and folded. Accordingly, severing after the shirring zone may involve a casing that is not uniformly round. This means that the arcuate members closing about the casing may not uniformly engage the casing circumference, or a casing crease or fold may become pinched between adjacent arcuate member. As a further problem, tears initiated about the circumference of the creased casing may tend to follow along the fold or crease lines and this interferes with the formation of a clean, shard-free transverse severing of the casing.

In the present invention, severing occurs in the shirring zone. Problems associated with the proper closing of arcuate members about the casing and shirring mandrel as well as the severing problems associated with attempting to sever casing creased and folded by shirring are minimized by preparing the casing feed stock for severing prior to entering the shirring zone.

In particular, the casing is prepared by weakening the feed stock along a narrow transverse band at a defined location along its length prior to entering the shirring zone. As the casing moves through the shirring zone, a tensile stress applied to the feed stock casing will easily sever it at the weakened area.

Also in the present invention, the severing is accomplished in a manner which incorporates the severed end portion of casing into the shirred stick so further operations to remove or dress a loose tail may not be needed.

OBJECTS OF THE INVENTION

One object of the present invention is to provide an improved method and apparatus for separating a length of shirred casing from the feed stock of unshirred casing.

Another object is to provide a casing severing method and apparatus which leaves little or no loose casing extending from the last-shirred end of the shirred length.

A further object is to provide a casing severing method and apparatus wherein the feed stock is weakened prior to shirring and severing is accomplished during shirring.

Still another object is to provide a method and apparatus for severing a shirred length from unshirred feed stock wherein the casing feed stock is severed on a bias relative to the casing longitudinal axis and a severed end is incorporated into the last-shirred end of the shirred length.

Yet another object is to provide a casing severing method and apparatus which draws a severed casing end up against the last-shirred end of a shirred length so as to provide the last-shirred end with a dressed, tail-free appearance.

A still further object is to provide a shirred stick wherein the severed ends of the casing at both the first-shirred and last-shirred ends of the stick, in a flattened condition, are cut on a bias relative to the longitudinal axis of the casing and are substantially free of shards which may rip free of the casing during an emulsion stripping operation.

SUMMARY OF THE INVENTION

In one aspect, the invention is characterized by a method of severing a shirred casing stick from a length of reel stock casing joined to the stick including the steps of:

a) weakening a flattened section of feed stock casing prior to shirring to form a frangible band of casing extending transverse the casing longitudinal axis and around its circumference;

b) drawing feed stock casing in the direction of the casing longitudinal axis on to a shirring mandrel towards and through a shirring zone and conducting a shirring operation in the zone which gathers the feed stock casing into pleats about the shirring mandrel to form the shirred stick;

c) continuing the conducting of the shirring operation until said frangible band is at the shirring zone;

d) thereafter, restraining the feed stock casing from moving and utilizing said shirring operation for tensioning the feed stock casing across the frangible band and tearing apart the casing along the frangible band thereby separating the shirred stick from the feed stock casing.

In another aspect, the invention is characterized by an apparatus for shirring and severing a stick of shirred casing from a length of reel stock casing joined to the stick comprising:

a) shirring means defining a shirring zone including a shirring mandrel extending through said zone wherein tubular feed stock casing is drawn in a longitudinal direction onto a first end of said mandrel and along said mandrel to said shirring zone where said feed stock is gathered into pleats against said mandrel to form a shirred stick of casing;

b) means located prior to said mandrel first end for transversly weakening but not severing a flattened section of said feed stock casing to provide a narrow frangible band of casing extending about the circumference of the feed stock casing;

c) restraining means operable for restraining the feed stock casing when said frangible band is adjacent said shirring means; and d) said shirring means cooperating with said restraining means for tensioning the feed stock casing across said frangible band and tearing apart the casing along said frangible band.

In accordance with the present invention, the feed stock casing is weakened, but not severed, prior to shirring to provide a narrow frangible band extending around the casing. The frangible band remains strong enough to withstand the rigors of shirring but will tear under tension. The frangible band is provided by any suitable means operating to perforate, score, thin, abrade or otherwise degrade the tubular wall of the casing along a narrow transverse band that extends about the circumference of the casing.

A preferred method according to the present invention, is to weaken the casing transversely by making a line of perforations that extends at an oblique angle across the flat width of the feed stock casing before the casing enters a shirring zone. Thereafter, when the casing is subjected to a tensile stress, the casing will tear apart along the line of perforations. The tear propagates from one perforation to another so the likelihood of forming a shard is reduced, and in any event, shards or flags of casing which may be produced tend to be so minute that they will not detract from the commercialization of the shirred casing.

Preferably the line of perforations in the feed stock should be made while holding the casing feed stock in a flattened condition. This allows the perforating means to penetrate completely through the casing. Also, in accordance with the present invention the perforations should extend across the entire flat width of the casing at an oblique angle relative to the longitudinal axis of the casing. The result is that when the casing is inflated for shirring, a line of perforations will extend around the entire circumference of the casing.

The perforations can take several forms. For example, a row of closely spaced sharpened pins can be used to make round perforations. Using a knife with a serrated edge will make a straight row of perforations across the casing.

A preferred perforating means has a sharpened edge provided with straight-sided teeth. With this arrangement the length of each perforation is constant regardless of the depth of penetration.

Whatever the shape of the perforating means, an important consideration is the number and length of perforations relative to the lands between the perforations. As noted above, the casing should not be so weakened by the number and length of the perforations that the forces applied to pull the casing onto the shirring mandrel and along the mandrel towards the shirring zone will cause the feed stock to sever prematurely. Conversely, if the casing is not sufficiently weakened, the casing may not cleanly sever along the line of perforation during the subsequent severing operation. Severing the casing occurs by putting the feed stock casing in tension just before the frangible band defined by the line of perforations is shirred.

Putting the casing in tension may be accomplished by stopping the shirring operation and reversing the rotation of the feed rolls. Preferably, however, increasing the tension is accomplished by restraining the longitudinal movement of the feed stock casing by braking the feed rolls to slow or stop the casing while continuing to operate the shirring means. The shirring means pulls on the casing at one side of the frangible band while the casing on the other side of the frangible band is restrained from moving by the braked feed rolls. The resulting tension on the casing causes it to tear along the line of perforations. Since the shirring means continues to operate, a torn end of the casing is drawn and gathered into the last-shirred end of the stick.

If the casing is not sufficiently weakened and the casing does not sever cleanly, the result may be severed edges so ragged with loose shards as to be unacceptable for the stripping operation that may follow stuffing. Whether a product is acceptably free of loose shards or flags of casing is subjective and depends in part on their number, size and distribution along the severed edge. The color of the casing also may enter into a consideration of acceptability since shards of a clear casing may be less noticeable than shards of a colored casing. The ultimate goal is to have a clean, shard free severed end. However, the goal of an acceptable casing is considered achieved if shards which are formed are so small that they do not readily detach from the casing during a conventional stripping operation.

According to the present invention, the perforations can be made at any point before the feed stock casing feeds onto the shirring mandrel. For example, the casing unwinds from a supply reel and is inflated after passing through a pair of nip rolls. The inflated casing then is laced onto the shirring mandrel. At any point prior to the shirring mandrel, the casing is, or may be, pressed to a flat width. Thus, the perforations can be made on the flat feed stock casing at a location between the supply reel and nip rolls or at the nip rolls or after the nip rolls. If the casing is perforated after inflation, a section of the inflated casing preferably is pressed flat and perforated. It also is possible to determine the length of casing to be contained in a stick and then perforate the casing at intervals corresponding to this length as casing is wound onto the supply roll. However, this is not preferred because in this case some accommodation must be made to control the operation of the shirring machine so the length shirred for each stick is coordinated with the length of the casing in the interval between the transverse perforations.

DETAILED DESCRIPTION OF THE INVENTION

Figure 1:
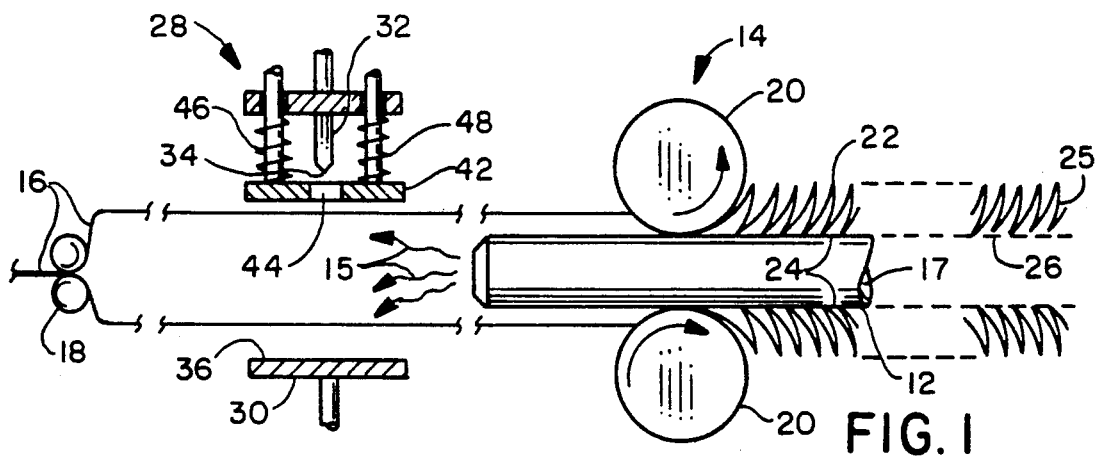
FIGS. 1–5 illustrate in schematic fashion the method steps of the present invention.

Referring to the drawings, FIG. 1 shows several elements of a conventional shirring machine as modified to incorporate components for severing the casing according to the present invention. The shirring machine itself is conventional. Only those components necessary to an understanding of the present invention will be described in detail. For example, a conventional shirring machine includes a mandrel 12 and a shirring head 14. It should be appreciated that the shirring machine can be either of the two types in general commercial use including a so-called "floating mandrel machine" of the type generally described in U.S. Pat. No. 3,766,603 or a "withdrawing mandrel" machine as generally described in U.S. Pat. No. 2,583,654.

Flattened feed stock casing 16 is drawn from a supply reel (not shown) and is fed onto the mandrel through the nip of driven feed rolls 18. As the casing passes onto the mandrel, it is inflated by a stream of air 15 issuing from an axial passage 17 in the mandrel.

Lubricants and/or moisture or other treatments incorporated into this air stream may be applied to the casing inner surface as is well known in the art. The inflated casing moves in the direction of its longitudinal axis along the mandrel and into the shirring head 14. The shirring head defines a shirring zone in which the inflated casing is gathered, e.g. shirred, into pleats about the mandrel 12 to form a shirred stick 22 which exits from the shirring zone. The innerfolds 24 of the pleats are formed against the mandrel and define a longitudinal bore 26 through the shirred stick. The shirring head 14 may comprise any of the known shirring means as described, for example, in U.S. Pat. Nos. 3,461,484, 4,185,358, 4,370,780 or 4,374,447 among others. For purposes of illustration, the shirring head 14 is shown as comprising a plurality of toothed shirring rolls 20, usually three in number of a general type which is described in U.S. Pat. No. 3,461,484.

It should be appreciated that the shirring proceeds in conjunction with conventional and known shirring techniques including the application of lubricants to the external surface of the casing and in conjunction with known shirred casing holdback means (not shown). This holdback means retards the advance of the shirred pleats along the mandrel in order to provide a substantially regular pleat formation wherein the pleats are laid tightly one against another. In a preferred embodiment the shirring rolls lay the pleats at an angle of about 30° with respect to the longitudinal axis of the mandrel so that the overall shirred length is somewhat like a stack of interconnected nesting cones. In a conventional shirring operation, the outside diameter of the shirred stick 22 is larger than the inflated diameter of casing feed stock 16.

After a desired length of casing has been shirred, the shirred stick must be separated from the feed stock. Once the shirred stick is separated, it may be subject to further operations (not shown) such as a compaction step to further reduce its length and a step to provide one end of the stick, e.g., the first shirred end 25, with a closure means.

For purposes of separating the shirred stick 22 from the feed stock 16, FIG. 1 shows a means generally indicated at 28 for working the casing to weaken it. Preferably the casing is weakened by perforating it so the means 28 is referred to as a perforating means. The perforating means 28 is positioned on the upstream side of the shirring zone, i.e. to the left of shirring head 14 as viewed in the figures. Preferably, the perforating means is located, as shown, between shirring head 14 and nip rolls 18 so it operates on casing which is at least partly inflated or expanded from its flattened condition. However, the perforating means also may be located upstream of the nip rolls or even at the nip rolls, in either case, so it operates on flat casing prior to inflation.

As will be described further hereinbelow, the perforating means 28 functions to prepare the feedstock casing for severing. This preparation occurs prior to drawing the casing onto the shirring mandrel and facilitates the severing which occurs after the casing is on the mandrel and before it passes completely through the shirring zone.

As shown in FIG. 1, one component of the perforating means is an anvil 30 at one side of the feed stock casing. A second component of the perforating means is a knife blade 32 which is located on the opposite side of the casing from the anvil. The blade is oriented perpendicular to the anvil and transverse the longitudinal axis of the casing. The edge 34 of the knife which is towards the casing is the knife cutting edge. The knife 32 and anvil 30 are movable one towards the other from an open position as shown in FIG. 1 to a closed position shown in FIG. 2. At the closed position, the knife blade 32 is closed against the anvil surface 36.

Figure 9:
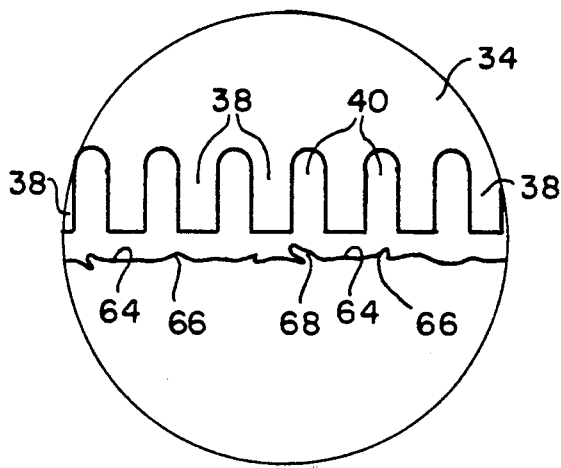
FIGS. 9 and 10 are each magnified views, of a portion of the severed end of the casing juxtaposed to a serrated knife blade used in preparing the casing for severing.
Figure 10:
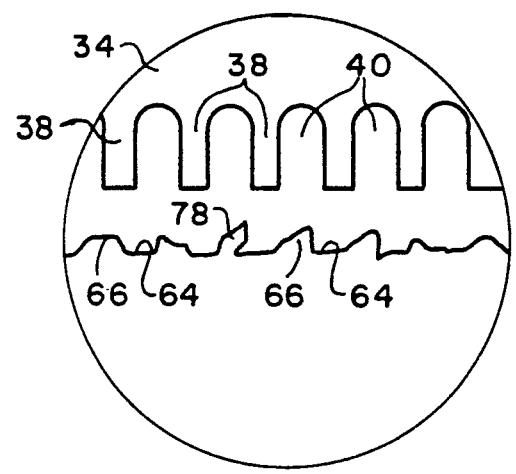

The knife edge 34 is not a continuous cutting edge, but is serrated as shown in FIGS. 9 and 10. Thus, when the knife closes against the anvil, the casing between the serrated knife edge and anvil is perforated. The serrations 38 along the knife edge 34 preferably have straight sides so the cutting edge is crenellated. With this arrangement the length of each perforation is not dependant upon the depth of the penetration of each serration through the casing. It has been found that a suitable knife blade is about 0.406 mm thick. The serrated edge has a pitch of about 0.508 mm wherein each straight sided serration 38 is each about 0.254 mm wide and each space 40 between serrations is about 0.254 mm wide. Such a blade is made by electro discharge machining the cutting edge of a conventional slotted razor blade to provide the serrated edge. For example, a suitable blade is a slotted, round end blade No. 00053 from CB Manufacturing and Sales Co., Inc.

To properly perforate the casing, the structure or material of the anvil surface must permit the knife serrations to pass cleanly through the casing engaged between the knife and the anvil. For example, a hard, rigid anvil surface may prevent the serrations from passing completely through the casing and may quickly dull the knife. A soft anvil surface may not provide the resistance needed to permit the knife serrations to penetrate the casing and will wear quickly. A preferred anvil surface is sufficiently resilient to permit some "give" as the knife serrations are pressed against it so that they can pass through the casing, yet is hard enough to avoid excessive wear. It has been found that a urethane pad having a type A durometer hardness of 80 provides a suitable anvil surface. A possible alternative is to provide the anvil surface 36 within a transverse groove (not shown) to receive the knife edge. The casing would bridge the groove and be supported as the knife serrations penetrate the casing and enter the groove.

As noted above, the perforations preferably are made across the flat width of the casing. Accordingly, to press the expanded feed stock casing to a flat width, FIG. 1 shows that perforating means 28 includes a pad 42 having a central opening 44 to accommodate the knife blade so that a portion of the pad is located at each side of the knife blade. The pad moves slightly in advance of the knife blade so the knife does not perforate the casing until after the pad 42 has contacted the casing and pressed it against the anvil surface 36. Coil springs 46, 48 bias the pad which allows the knife to continue to travel through opening 44 and against the anvil after the pad has seated against the anvil.

In a preferred embodiment the perforating means is disposed at an oblique angle with respect to the longitudinal axis of the casing. With this arrangement the resulting line of perforations 50 (FIG. 3) extends slantwise across the casing flat width for purposes described further hereinbelow.

In operation, the shirring of the inflated feed stock 16 as illustrated in FIG. 1 progresses until the desired length of shirred stick 22 accumulates on mandrel 12. The feeding and shirring operations stop and several events occur in rapid sequence.

Figure 2:
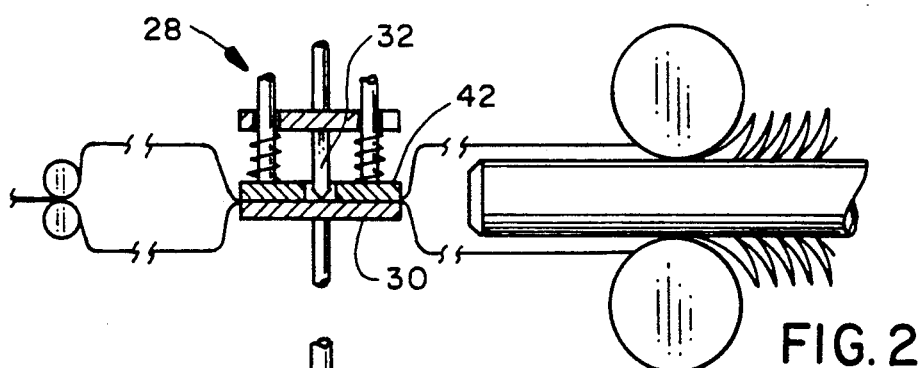
Figure 3:
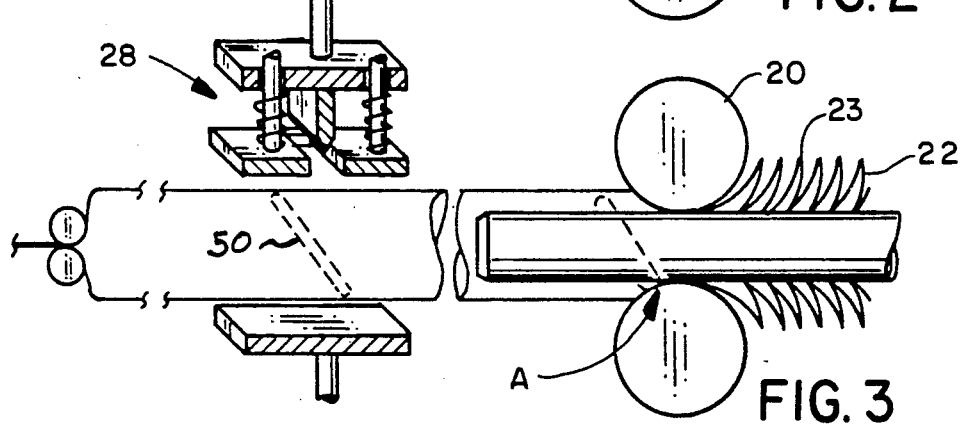

The severing means 28 closes against the casing to the position shown in FIG. 2. Preferably, the inflating air is turned off, but the air pressure may be only reduced prior to flattening. In either case, as the severing means closes, anvil 30 and pad 42 first engage and then collapse the casing to substantially the flat width of the casing in advance of the knife edge 34. When the serrated knife edge reaches the anvil 30, it presses the casing to the anvil surface and the serrations penetrate the casing to provide a line of perforations 50 which extend slantwise, e.g. at an oblique angle, across the flat width of the casing (FIG. 3).

The severing means 28 then opens. While some inflating air may escape through the perforations, the air flow nevertheless is sufficient to reinflate the casing. In its reinflated condition, as shown in FIG. 3, the perforations made by the serrated knife edge now form a line of perforations 50 which extends about substantially the entire circumference of the casing.

The feeding and shirring operations start again and proceed until the leading edge of the oblique line of perforations 50 reaches a location indicated at "A" which is just in advance of the last-shirred end 23 of shirred stick 22. Before the line of perforations can pass through the shirring zone, shirring stops and the movement of the feed stock casing is restrained by applying a brake to feed rolls 18. Now when the shirring rolls 20 are rotated, they draw on the feed stock casing and put it into tension across the line of perforations so the casing tears along the line of perforations.

Figure 4:
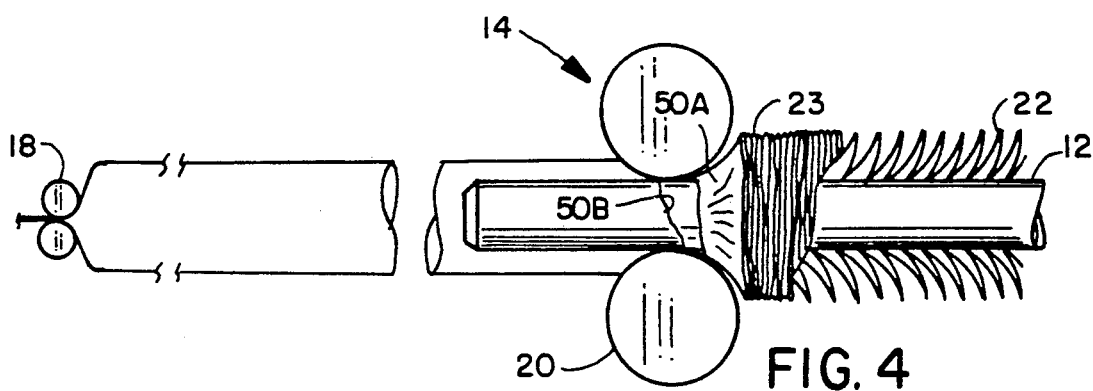

As best seen in FIG. 4, a torn end 50A of the feed stock casing is drawn away from the restrained feed stock casing torn end 50B. As shirring rolls 20 continue to rotate, the torn end 50A is drawn through the shirring zone and is incorporated into the last shirred end 23 of the shirred stick 22.

Figure 5:
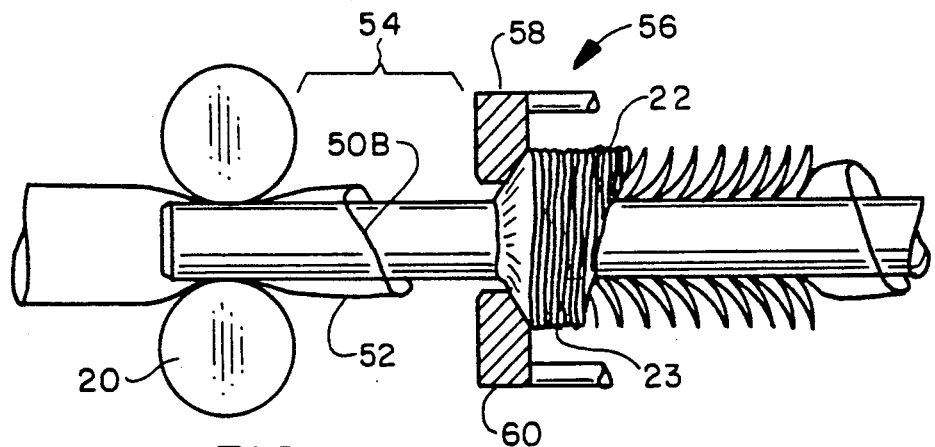

Shirring stops and, as shown in FIG. 5, the mandrel 12 is displaced several inches in the shirring direction (longitudinally to the right as shown in the figures). The longitudinal displacement of mandrel 12 carries the shirred stick 22 away from the shirring rolls 20 and, at the same time, the shirring rolls 20 and feed rolls rotate so a section 52 of the feed stock casing containing end 50B is pulled through the shirring zone.

By displacing the mandrel, a space 54 is provided between the shirring rolls 20 and the last-shirred end 23 of the shirred stick.

The purpose of providing the clearance space 54 is to allow room so a transfer means 56, including a set of jaws 58, 60 can close radially into the space 54 and towards the mandrel 12. The jaws close, and the transfer means 56 operates to transfer the shirred stick 23 down the mandrel to a location (not shown) where other operations are performed such as axial compaction to further reduce stick length, and the formation of an end closure. As the shirred casing is transferred down the mandrel, the shirring machine components including the mandrel return to a start position, the pressure of the inflating air is returned to an operational pressure and the next shirring cycle is started.

The line of perforations 50 (FIG. 3) forms a frangible band extending at an oblique angle around the circumference of the casing. As the casing parts along this frangible band, it is speculated that tears initiate at many locations simultaneously around the casing at stress concentration points at the ends of the perforations. These tears however, propagate only a short distance before either running into an adjacent perforation or into a tear emanating from an adjacent perforation.

Figure 6:
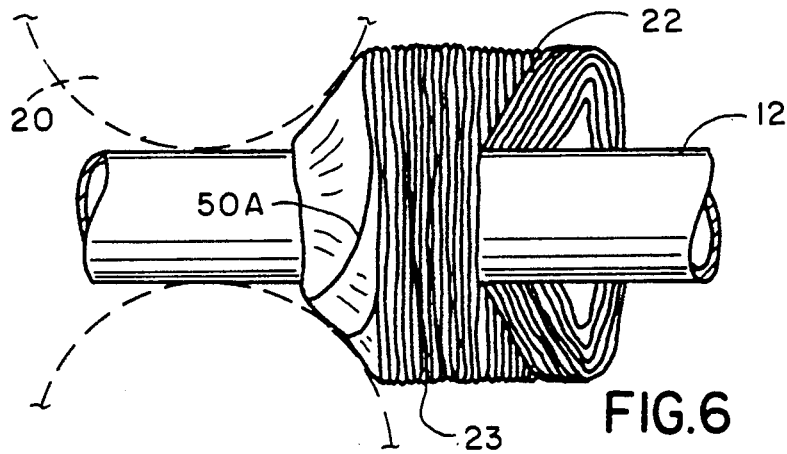
FIG. 6 is a perspective view on an enlarged scale showing the last-shirred end of a casing in accordance with the present invention.

FIG. 6 illustrates, on a larger scale, the last shirred end 23 of shirred stick 22. As noted above, shirring in accordance with known conventional techniques provides a shirred stick 22 which has a larger diameter than the feed stock casing. By perforating and subsequently tearing the feed stock casing at an oblique angle relative to the casing longitudinal axis as per the present invention, the total length of the torn end is greater than the circumference of the feed stock casing. This greater length allows the shirring rolls 20 to draw the severed end 50A up into a pleat which lies relatively flat against the end of the stick. This provides the last-shirred stick end 23 with a neat appearance and avoids a loose tail of casing which may droop or sag from the end of the stick to partly occlude the bore opening so that additional operations to form or mold the last-shirred end of the stick may not be necessary.

The measure of the oblique angle relative to the longitudinal axis of the casing is important for insuring a proper incorporation of the torn end 50A into the last-shirred end of the stick. For example, if the angle is too shallow the torn end 50A will be excessively long. This may result in a portion of the torn end extending from the outer surface of the shirred stick or along the stick outer surface. If the angle is too steep, the length of the torn end 50A may be so short as to prevent the proper gathering of the torn end up against the last-shirred end of the stick. An appropriate angle depends upon such factors, among others, as casing diameter, the outside diameter of the stick and the cone angle of pleats formed by the shirring means. For purposes of the present invention an angle of about 15° from vertical (e.g. perpendicular to the longitudinal axis of the flattened casing) has proved suitable. However, it would be well within the skill of the art to determine the angle most appropriate for a given shirring condition.

Figure 8:
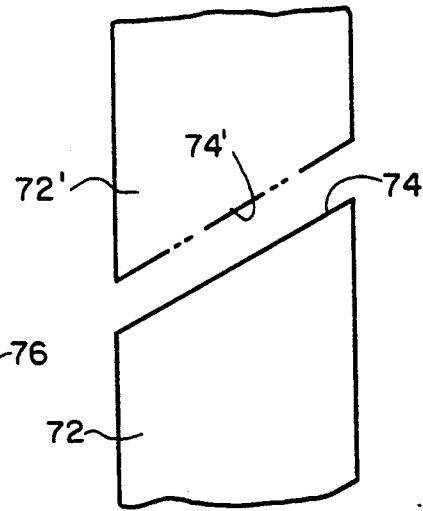
FIG. 8 is a full scale view showing the end of a casing severed according to the present invention.

FIG. 8 is a full size view showing an end 72 of a casing severed in accordance with the present invention. The casing is shown laid flat so the full width of the severed end can be examined. Casing end 72 has a substantially straight terminal edge 74 extending at an angle relative to the longitudinal axis of the casing. Shown in phantom line in FIG. 8 is the adjacent severed end 72' with its terminal edge 74'. One end 72 or 72' will be located at a first-shirred end of a stick while the other end 72 or 72' will be at the last shirred end of a shirred stick.

Figure 7:
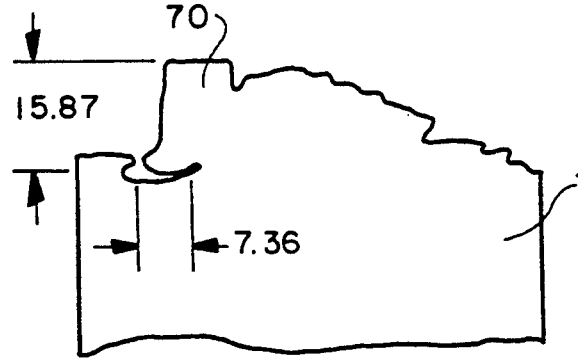
FIG. 7 is a full scale view showing the end of a casing severed according to a prior art method.

In contrast, FIG. 7 shows an end 76 of a casing severed in accordance with a conventional severing method. The casing in FIG. 7 has been slit longitudinally and laid flat so the full circumference of the casing is visible. The casing in each instance is a Viskase Corporation NOJAX cellulosic casing having a nominal diameter of about 21.08 mm. The casings are both shirred in the identical fashion on the same shirring machine. Severing to produce the prior art casing as shown in FIG. 7 is in accordance with the teachings of U.S. Pat. No. 4,885,821. As taught in the '821 Patent a member, including an annular knife edge, is closed about the end 23 of the shirred stick. The member is then moved longitudinally and pressed against the end 23 of the shirred casing while holding the feed stock casing at the nip rolls 18. This puts the casing in tension so it tears along the annular knife edge. This arrangement was changed slightly to make the severed end 72 according to the present invention as shown in FIG. 8. In particular, the knife edge was removed from the member so only an unsharpened portion of the member was closed and pressed against the casing end face 23. Also a perforating means 28 was added and the apparatus was operated in accordance with the method of the present invention.

The terminal edge of the prior art severed end 76 as seen in full size in FIG. 7 includes a shard 70 measuring approximately 7.36×15.87 mm.

In contrast, the casing severed according to the present invention, also seen in full scale, (FIG. 8) has a transverse terminal edge 74 which is considerably sharper and less ragged than the casing end of FIG. 7.

FIGS. 9 and 10 each show a portion of a severed casing end of the invention under 20×magnification juxtaposed with the knife blade used to perforate the casing as described above. In FIG. 9, the blade used has teeth 0.254 mm wide separated by a space of 0.254 mm.

FIG. 10 is similar to FIG. 9 except the knife blade shown juxtaposed to the severed end has teeth 0.177 mm wide separated by a space of 0.330 mm. Thus, the pitch of the serrated edge of this blade is similar to that shown in FIG. 9, but the individual teeth are narrower.

In each case (FIGS. 9 and 10) one or more shards can be identified as for example at 68 in FIG. 9 and at 78 in FIG. 10. However, the shard 68 measures only about 0.178×0.203 mm and the shard 78 measures only about 0.229×0.279 mm. These shards apparently formed when a tear propagated slightly around an adjacent perforation rather than into it. These shards, as seen under 20×magnification would not detract from the commercial use of the casing because shards of this size are not likely to be grasped and torn free from the casing edge by a conventional stripping operation.

The straight, sharp edge segments 64 produced by the serrated knife blade edge perforating the casing are readily identified at various locations along the severed ends. Between edge segments 64 there are land segments 66 that are raised slightly above the plane of the segments 64. These land segments 66 represent the unperforated casing which has torn between the perforations. In some instances these land segments 66 are relatively flat and in other instances, they are more triangular. In either case, the combination of the straight, sharp edge segments 64 and adjacent land segments 66 gives the severed end a crenellated appearance over at least a portion of its length.

Figure 11:
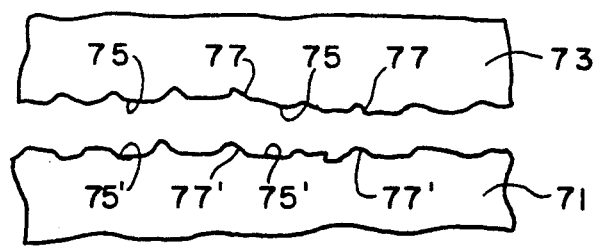
FIG. 11 is a magnified view showing portions of the adjacent ends of casing severed in accordance with the present invention.

FIG. 11 shows the profile of a portion of two adjacent severed ends magnified about 20×. Casing end 71 is the end associated with the last-shirred end face 23 of the shirred length 22. Casing end 73 is the end associated with the feed stock casing. This end 73 will become the end of a shirred length formed to an end closure and accordingly, it corresponds to the end of a shirred length identified at 25 in FIG. 1.

FIG. 11 illustrates that the opposite ends of a shirred casing article according to the present invention will each have a transverse terminal edge which is crenellated over at least a portion of its length. As shown in FIG. 11, the straight edge segments produced when the casing is perforated by the knife edge define the lands 75 on severed end 73 and the valleys 75' on the opposite severed end 71. Conversely, the torn casing between the perforations define the valleys 77 on the severed end 73 and the lands 77' on the opposite end 71.

In any event, shards which may appear along either edge, are not likely to detract from the commercial use of the casing so that both ends can undergo a stripping operation.

Thus, it will be appreciated that the present invention provides a method and apparatus for severing casing which produces a straight transverse edge extending at an oblique angle to the longitudinal axis of the casing wherein the edge is substantially free of shards or flags of casing likely to pull or tear free of the casing during use.

Also, relying on rotation of the shirring means to provide the tension for tearing the casing along the line of perforations allows a torn end of the casing to be incorporated into the last-shirred end of the stick.

It is possible to stop the flow of inflating air prior to closing the serrated knife against the casing. However, the inflating air can be left on if a pressing means is provided to press and hold the inflated casing to a flat width prior to moving the serrated knife against the casing. Moreover, while the description herein refers to stopping the shirring operation to perforate the casing, a knife that tracks along the casing for a short distance or a rotary knife may be used to perforate the casing without stopping the movement of the casing in the shirring direction.

Having described the invention in detail, what is claimed as new is:

1. A method of severing a shirred casing stick from a length of feed stock casing comprising the steps of:
   a) weakening a flattened section of feed stock casing prior to shirring to form a frangible band of casing extending transverse the casing longitudinal axis and around its circumference;
   b) drawing feed stock casing in the direction of the casing longitudinal axis on to a shirring mandrel towards and through a shirring zone and conducting a shirring operation in the zone which gathers the feed stock casing into pleats about the shirring mandrel to form the shirred stick;
   c) continuing the conducting of the shirring operation until said frangible band is at the shirring zone; and
   d) thereafter restraining the feed stock casing from moving and utilizing said shirring operation for tensioning the casing across the frangible band and tearing apart the casing along the frangible band thereby separating the shirred stick from the feed stock casing.

2. A method as in claim 1 wherein said weakening comprises perforating the flattened section of casing at an oblique angle relative to the longitudinal axis of the feed stock casing to provide a succession of closely spaced perforations, extending slantwise across the casing and forming the frangible band.

3. A method as in claim 1 wherein after tearing apart, said shirring operation draws a torn end of the feed stock casing into the last-shirred end of the stick.

4. A method as in claim 3 including:
   a) longitudinally separating the shirring zone and the last-shirred end of the separated shirred stick to provide a space therebetween; and
   b) closing a transfer means into said space and pressing the transfer means longitudinally against the last-shirred end of the separated shirred stick for moving the severed shirred stick along the mandrel.

5. A method of separating a shirred casing stick from a length of unshirred feed stock casing wherein flattened tubular casing is drawn from a feed stock on a supply roll, inflated and moved longitudinally over a mandrel and into a shirring zone, and then is shirred in the shirring zone to form a shirred stick such that one end face of the strand merges with unshirred casing in the shirring zone, including the steps of:
   a) prior to moving the inflated casing over the mandrel, perforating a section of the casing to provide a line of perforations extending around the casing at an oblique angle relative to the longitudinal axis of the casing such that the line of perforations is longer than the circumference of the casing;

b) drawing the perforated section of casing over the mandrel and up to the shirring zone; and c) subjecting the perforated section to tension across the line of perforations by restraining the feed stock while performing a shirring operation thereby tearing apart the casing along the line of perforations.

6. A method as in claim 5 wherein said perforating step is accomplished while maintaining the section of casing in the flattened condition to provide a succession of closely spaced perforations extending at an oblique angle transverse the flat width of the section.

7. A method as in claim 5 including continuing said shirring operation after tearing apart the casing for gathering and incorporating a torn end of the feed stock casing into the last-shirred end of the stick.

8. Apparatus for severing a stick of shirred tubular food casing from feed stock casing comprising:

a) shirring means defining a shirring zone including a shirring mandrel extending through said zone wherein tubular feed stock casing is drawn in a longitudinal direction onto a first end of said mandrel and along said mandrel to said shirring zone where said feed stock is gathered into pleats against said mandrel to form a shirred stick of casing;

b) means located prior to said mandrel for transversly weakening but not severing a flattened section of said feed stock casing to provide a narrow frangible band of casing extending about the circumference of the feed stock casing;

c) restraining means operable for restraining the feed stock casing when said frangible band is adjacent said shirring means; and d) said shirring means and said restraining means cooperating for tensioning the feed stock casing across said frangible band and tearing apart the casing along said frangible band.

9. Apparatus as in claim 8 wherein said shirring means, after the tearing apart of the casing, is operable to shirr and incorporate a torn end of the feed stock casing into a last-shirred end of said stick.

10. Apparatus as in claim 8 wherein said means for weakening said feed stock casing is a perforating means for forming a succession of closely spaced perforations at an oblique angle across the flat width of the casing, said succession of perforations defining said frangible band.

* * * * *